United States Patent
Bernadat et al.

(10) Patent No.: US 7,093,242 B2
(45) Date of Patent: Aug. 15, 2006

(54) DYNAMIC CLASS INTERPOSITION

(75) Inventors: Philippe Bernadat, Varces (FR); Dejan Milojicic, Palo Alto, CA (US); Guangrui Fu, Palo Alto, CA (US); Alan Messer, Sunnyvale, CA (US); Ira Greenberg, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 622 days.

(21) Appl. No.: 09/993,229

(22) Filed: Nov. 19, 2001

(65) Prior Publication Data

US 2003/0106043 A1 Jun. 5, 2003

(51) Int. Cl.
*G06F 9/44* (2006.01)

(52) U.S. Cl. .................................................. 717/166
(58) Field of Classification Search ................ 717/116, 717/118, 137, 143, 148, 151, 166
See application file for complete search history.

(56) References Cited

U.S. PATENT DOCUMENTS

| | | | | |
|---|---|---|---|---|
| 5,893,118 | A * | 4/1999 | Sonderegger | 707/203 |
| 5,966,702 | A * | 10/1999 | Fresko et al. | 707/1 |
| 5,974,428 | A * | 10/1999 | Gerard et al. | 707/203 |
| 6,542,900 | B1 * | 4/2003 | Xia | 707/103 Y |
| 6,643,652 | B1 * | 11/2003 | Helgeson et al. | 707/10 |
| 6,654,954 | B1 * | 11/2003 | Hicks | 717/162 |

OTHER PUBLICATIONS

Harpin, "Using java.lang.reflect.Proxy to interpose on Java Class Methods", Sun Inc., retrieve from internet <http://java.sun.com/developer/technicalArticles/JavaLP/Interposing>, Jul 2001.*
Bernadat et al., "Tailoring Java for a Pervasive Service Infrastructure", Hewlwtt-packard Company, Jan. 31, 2002.*
The Java Virtual Machine Specification, Chapter 4, The class File Format, 1999 [online], accessed Oct. 19, 2005, Sun Microsystems, Retrieved from Internet <URL: http://java.sun.com/docs/books/vmspec/2nd-edition/html/ClassFile.doc.html>, 40 pages.*
The Java Virtual Machine Specification, Chapter 5, Loading, Linking, and Initializing, 1999 [online], accessed Oct. 24, 2005, Sun Microsystems, Retrieved from Internet <URL: http://java.sun.com/docs/books/vmspec/2nd-edition/html/ConstantPool.doc.html>, 11 pp.*
Chuck McManis, "The basics of Java class loaders," Oct. 1996, JavaWorld, 7 pages.*

(Continued)

*Primary Examiner*—Tuan Dam
*Assistant Examiner*—Eric B. Kiss

(57) ABSTRACT

Method and apparatus for extending functionality of a first set of classes and methods in an application hosted by a computing arrangement. A mapping is established that maps original class names in the first set to corresponding substitute class names of classes in a second set. The classes in the second set change the functionality of the classes in the first set. In response to loading a class file of a class in the first set, the original class names are replaced with corresponding substitute class names in the class file. Classes referenced by the substitute class names are then instantiated in lieu of classes referenced by the original class names.

13 Claims, 2 Drawing Sheets

OTHER PUBLICATIONS

Alexander Popeil, "Re: Applet Accessing a file on my server—why do I get SecurityException?," Mar. 25, 1998 [online], accessed Oct. 24, 2005, Retrieved from Internet <URL: http://209.119.0.18/SCRIPTS/WA-MSD.EXE?A2=ind9803d&L=java-com&T=0&F=&S=& P = 5802>, 1 page.*

Zhenyu Qian, et al., "A Formal Specification of Java™ Class Loading," Proceedings of the 15th Conference on ObjectOriented Programming, Systems, Languages, and Applications. ACM Press, 2000; pp. 325-336.*

Bill Venners, "The Java class file lifestyle," Jul. 1996, JavaWorld, 5 pages.[*

Dahm, M. "Byte Code Engineering", Java-Information-Tage 1999 (JIT '99), Sep. 1999.

Harpin, T. Using class java.lang.reflect.Proxy to interpose on Java Class Methos. SUN's developer technical articles, Jul. 2001.

Keller, R. and Holzle, U. "Binary Component Adaptation", ECOOP '98 Conference Proceedings of the third WMCSA, 2000.

Lee, H., B., and Zorn, B., G., "BIT: A Tool for Instrumenting Java Bytecodes", Usenix Conference Proceedings, Dec. 1997.

Dynamic Proxy classes. JDK1.3 documentation guide, 1999.

* cited by examiner

DYNAMIC CLASS INTERPOSITION

FIELD OF THE INVENTION

The present invention generally relates to client-server computing applications, and more particularly to accessibility of services in a mobile computing environment.

BACKGROUND

A web-enabled device in its most basic form is a computing platform that provides a user with access to the World Wide Web. More specialized instances include web-enabled mobile telephones and web-enabled personal digital assistants (PDAs). The handheld devices are especially popular given their portability.

Web-enabled devices are expected to proliferate as prices fall and functionality increases. However, one hurdle impeding widespread acceptance is compatibility between services and the wide variety of web-enabled devices. The success of some web services and portable web-enabled devices are intertwined. For a particular service to be commercially successful, it is desirable for the service to be compatible with a variety of web-enabled devices and user expectations. Likewise, for a web-enabled device to be successful, the device must be compatible with a variety of services. The companies that provide the services and develop the devices are often faced with moving targets in terms of device capabilities and service requirements.

One choice for dealing with diverse devices is to implement applications in the JAVA™ virtual machine environment. The JAVA virtual machine provides a platform independent environment to host applications, However, even though JAVA works well for servlets and applets on desktop computers, JAVA is missing some infrastructure that is needed to support mobile execution of services. In particular, JAVA is lacking in support of transparent remote storage and disconnected operation.

For connection, storage, and other compatibility issues, prior solutions involved modifying the service application or modifying system software. One problem associated with these approaches is that access to the appropriate source code is required. In addition, the resulting solution may be platform dependent, which may limit the viability of the solution.

A system and method that address the aforementioned problems, as well as other related problems, are therefore desirable.

SUMMARY OF THE INVENTION

In various embodiments, the invention extends the functionality of a first set of classes and methods in an application hosted by a computing arrangement without modifying the application itself. A mapping is established that maps original class names in the first set to corresponding substitute class names of classes in a second set. The classes in the second set change the functionality of the classes in the first set. In response to loading a class file of a class in the first set, the original class names are replaced with corresponding substitute class names in the class file. Classes referenced by the substitute class names are then instantiated in lieu of classes referenced by the original class names.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
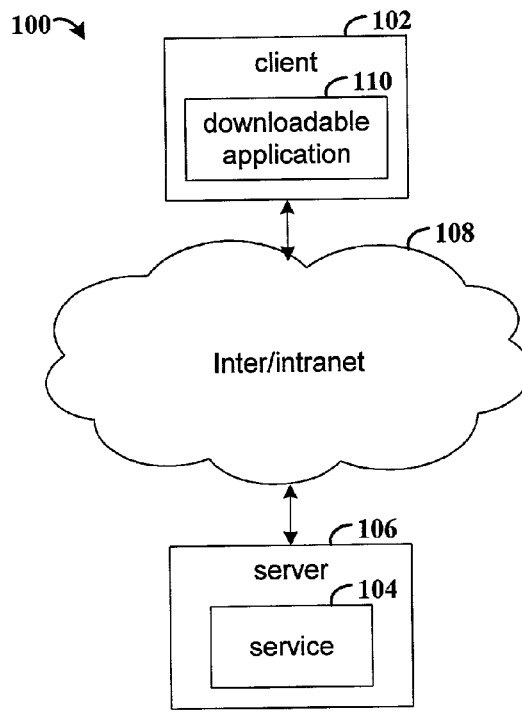
FIG. 1 is a functional block diagram of a computing arrangement in which services are made accessible to client systems via downloadable applications.

FIG. 1 is a functional block diagram of a computing arrangement 100 in which services are made accessible to client systems via downloadable applications. Client 102 is the device through which a user interacts with a service 104 that is hosted by server system 106. Client 102 and server 106 are coupled via a network, for example the Internet or a organization's intranet 108. Example services include personal information management services, travel services, and entertainment services. In general, the features provided by the service dictate the types of devices that are suitable for use as client 102. For some services, users may desire accessibility on a variety of devices ranging from workstations to hand-held devices.

Many services interact with users via downloadable application programs. For example, service 104 is initiated via a control mechanism that is provided at client 102. Based on application-specific requirements, the service at some time in its process flow transmits a downloadable application to client 102. The downloadable application implements one or more functions that are associated with the service 104. Client 102 hosts software that executes the downloadable application.

Adaptations of legacy applications (services) to today's mobile computing environment must address the issues related to data storage and disconnection. To support remote storage and disconnections, either the application or the virtual machine has to be modified. In changing the application source code, there will be a significant cost incurred, along with the possibility of introducing protocol/server dependencies into the application. Another problem is that the source code may be unavailable. If the virtual machine is modified, not only is access to the source code required, but all the different variants of the virtual machine must be maintained.

Figure 2:
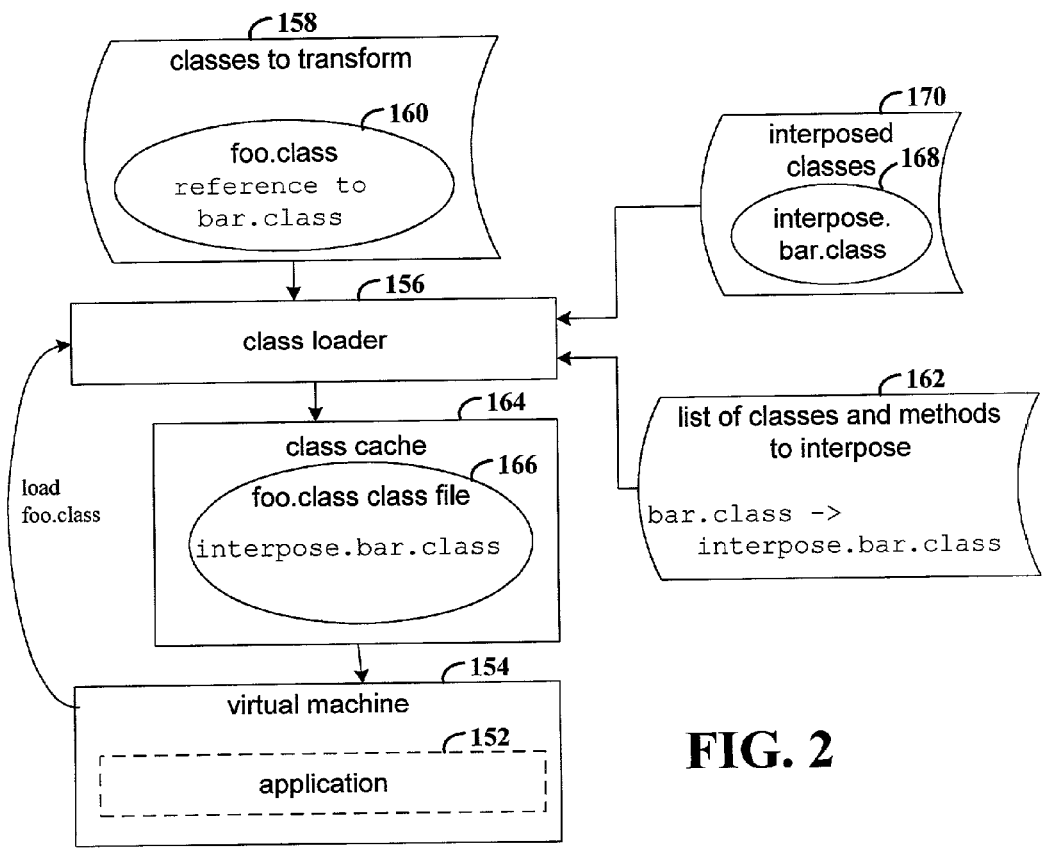
FIG. 2 is a functional block diagram that illustrates the interposition of an interposed class for an original class in accordance with one embodiment of the invention.

FIG. 2 is a functional block diagram that illustrates the interposition of an interposed class for an original class in accordance with one embodiment of the invention. In one embodiment of the invention, standard JAVA application programming interface (API) classes and methods are extended without modifying either the application source code or the JAVA virtual machine and standard API library. For a JAVA based implementation, JAVA byte-codes are modified at load time and prior to resolution, such that standard JAVA application programming interface (API) class intantiations and method invocations are replaced by instantiations and invocations of extensions of the original class or substitutes of the original methods.

In a more general embodiment of the invention, a class loader 156 retrieves a class file in response to a load class directive from the virtual machine 152. The virtual machine issues the load class directive in response to the constructor invoked by an application 152 executing within the virtual machine. It will be appreciated that the class may also be loaded in response to being referenced by another class. The class file 160, for example foo.class, can be read from either local or network storage. The class foo.class references an example standard API class bar.class.

Classes 158 represents a set of classes to be transformed by class loader 156. Class loader 156 uses a list 162 of classes and methods to determine which classes and methods are to be interposed. List 162 maps names of classes and methods to corresponding names of classes and methods to interpose. For example, an entry in the list maps bar.class to interpose.bar.class. Depending on implementation requirements, list 162 may also map methods that are to be interposed in addition to mapping classes. For example, "final" and "abstract" classes can not be extended. Thus, individual method invocations in substituted instead.

It will be appreciated that list 162 can be provided in various forms to class loader 156, for example as a downloadable configuration file or as a locally stored configuration file. Alternatively, the list may be statically built into the class loader.

After class loader 156 retrieves the class file for foo.class, references in the class file for foo.class to the class names and method names in list 162 are replaced with the corresponding name of the substitute class. For example, because foo.class includes the reference to bar.class and bar.class is in the list 162, references to bar.class in class file 166 are replaced with interpose.bar.class. In one embodiment, the modified class file is stored in class cache 164 to accelerate subsequent loading of subclasses and methods of foo.class. It will be appreciated that the class file need not be cached if the reduction in access time is not deemed beneficial relative to the costs associated with implementing and maintaining the cache. Thereafter, the modified class file, referencing interpose.bar.class, is returned to the virtual machine. Thus, the interposition of the substitute class is entirely transparent to the application 152 as well as virtual machine 154.

In the general case, classes 158 are classes that will be transformed by interposition of the interposed classes 170. For example, in a specific embodiment, classes 158 are selected JAVA system classes that are transformed. The interposed classes 170 are used in lieu of or as extensions of the selected JAVA system classes. It will be appreciated that in one embodiment, the interposed classes are installed on the client as a "middleware" software layer. Application 152 refers to the interposed classes 170 instead of classes 158 (e.g., the JAVA system classes).

The following description describes an example implementation of the present invention. The example implementation interposes substitute classes and methods for standard JAVA API classes and methods. The particular classes and methods that are interposed are selected to address various issues relating remote storage, disconnection, and concurrency within a single JAVA virtual machine.

Management of the user's data in a mobile environment impacts the JAVA Implemenation. For example, access to distant resources (JAVA classes, user data, URLs) must be detected and locally cached so that disconnection is a non-fatal event and performance remains acceptable. In order for an end-user's personal data and profiles to be available on the possible devices at the user's disposal, the data must be persistent and securely stored. This requirement implies a third party storage provider to store and retrieve the data in the JAVA implementation, an objective is to support legacy services without imposing any software changes to support the remote storage. Many embedded and mobile devices do not facilitate remote storage. Because applications use the standard java.io package to store data, the JAVA implementation is arranged such that when methods are invoked from this package, the files are transparently loaded, refreshed and updated on the remote storage server. Similarly methods such as java.awt.Toolkit.getImage are redirected to the remote storage server.

Disconnection issues also impact the JAVA implementation. Continuous internet connectivity can be expensive and interruptions in service can be expected. Some types of services or applications may proceed locally if the user's data and URLs are cached on the client device. The cache content is regularly synchronized and flushed if required. IN the example embodiment, the JAVA implementation.

Table 1 briefly summarizes the standard JAVA APIs that are modified.

TABLE 1

| Class | Reason |
|---|---|
| java.io.File | User files are cache locally. The |
| java.io.FileInputStream | cached local file is extended so |
| java.io.FileReader | that it be filled/refreshed/ |
| java.io.FileWriter | flushed from/to a remote storage |
| java.io.FileOutputStream | server. |
| java.io.RandomAccessFile | |
| java.io.PrintWriter | |
| java.util.zip.ZipFile | |
| java.awt.FileDialog | The dialog browser must browse the content of the remote storage server. |
| java.awt.Toolkit | getImage( ) must lookup the remote storage thorough the cache. |
| java.net.URL | Cache URLs. |
| java.net.URLConnection | Handle post requests. |

The following paragraphs present example JAVA source code in which substitute classes and methods are interposed. The examples are presented for illustration only, and it will be clear from the discussion accompanying FIG. 2 that the application source is not required. The interposition is accomplished instead by modification to the class files.

The following example code illustrates interposition of a class. In the general case, interposition of the instances of class "A" with instances of class "interposed.A" requires that "new" statements and constructor invocations for class A be respectively replaced by "new" statements and constructor invocations for class "interposed.A". The following class:

```
import java.io.File;
public class SimpleFile {
    static public File file;
    public File add( ) {
        return new File("add");
    }
    public static void main(String argv[ ]) {
        file = new File("aFile");
        String name = file.getName( );
        file = new SimpleFile( ) .add( );
    }
}
``` is transformed as (changes underlined):

```
import interpose.java.io.File;
public class SimpleFile {
    static public java.io.File file;
    public java.io.File add( ) {
        return new File("add");
    }
    public static void main(String argv[ ]) {
        file = new File("aFile");
        String name = file.getName( );
        file = new SimpleFile( ) .add( );
    }
}
```

The class public fields declaration (File file), and method signatures (File add) are not modified since they are exported outside of the class. The class extension would contain statements such as:

```
package interpose.java.io;
public class File extends java.io.File {
    public File(String name)
    throws NullpointerException{
        // . . our own initialization
    }
    public long lastModified( ) {
        // . . .
    }
    // other modified APIs . . .
}
```

Since the newly created object is an extension, no other statements need to be modified. Any number of APIs from this class can be overwritten in the extension.

Because abstract and final classes cannot be interposed, the methods associated with these types of classes in interposed instead. Example final classes include java.net.URL, java.lang.System, and java.lang.Class. Example abstract classes include java.awt.Toolkit and java.net.URLConnection. Instead of replacing new and <init> method invocations, calls to the class methods that need to be altered are replaced with calls to a static method of a new abstract class. The following is an example of the getProperties method from the java.lang.System abstract class. An initial class such as:

```
public abstract class GetProperty {
    public static void main(String argv[ ]) {
        String s;
        s = System.getProperty("foo");
    }
}
would be modified to:
public abstract class GetProperty {
    public static void main(String argv[ ]) {
        String s;
        s = interposed.System.getProperty("foo");
    }
}
```

An example new abstract file is:

```
package interpose.java.lang;
    public abstract class System {
        public static String getProperty(String s) {
            // . . . any specific code . . .
                return (String) . . .;
        }
    }
The following example relates to the final class java.net.URL:
import java.net.URL;
public class SimpleURL {
    public static void main(String argv[ ]) {
        try {
            URL url = new URL("foo");
            InputStream is;
            is = url.openStream( );
        } catch (Exception e) {
        }
    }
}
```

The modified code would be:

```
import java.net.URL;
public class SimpleURL {
    public static void main(String argv[ ]) {
        try {
            URL url = new URL("foo");
            InputStream is;
            is = interposed.java.net.URL.openStream(
                url);
        } catch (Exception e) {
        }
    }
}
```

An example new abstract class is:

```
package interpose.java.net;
    public abstract class URL {
        public static InputStream
            openStream (java.net.URL url)
            throws IOException {
            // . . . specific code
            return (InputStream) . . .
        }
    }
```

It will be appreciated that the substituted method may be a constructor (<init>) as it is the case for the URL (java.net.URL, java.lang.String) constructor. Whereas for class interposition the replacement method initializes an instance of the extended class, in the final class the method must return (versus initialize) an instance of the initial class. Thus, the following class:

```
import java.net.URL;
public class SimpleURL {
    public static void main(String argv[ ]) {
        try {
            URL url = new URL("foo");
            url = new URL(url, "bar");
        } catch (Exception e) {
        }
    }
}
``` is replaced by:

```
import java.net.URL;
public class SimpleURL {
    public static void main(String argv[ ]) {
        try {
            URL url = new URL("foo");
            url = interposed.java.net.URL.URL(url, "bar");
        } catch (Exception e) {
        }
    }
}
```

An example abstract class is:

```
package interpose.java.net;
    public abstract class URL {
        public static java.net.URL
            URL (java.net.URL context, String spec)
        throws MalformedURLException {
        // . . . any specific code . . .
        return (java.net.URL) . . .
        }
    }
```

Figure 3:
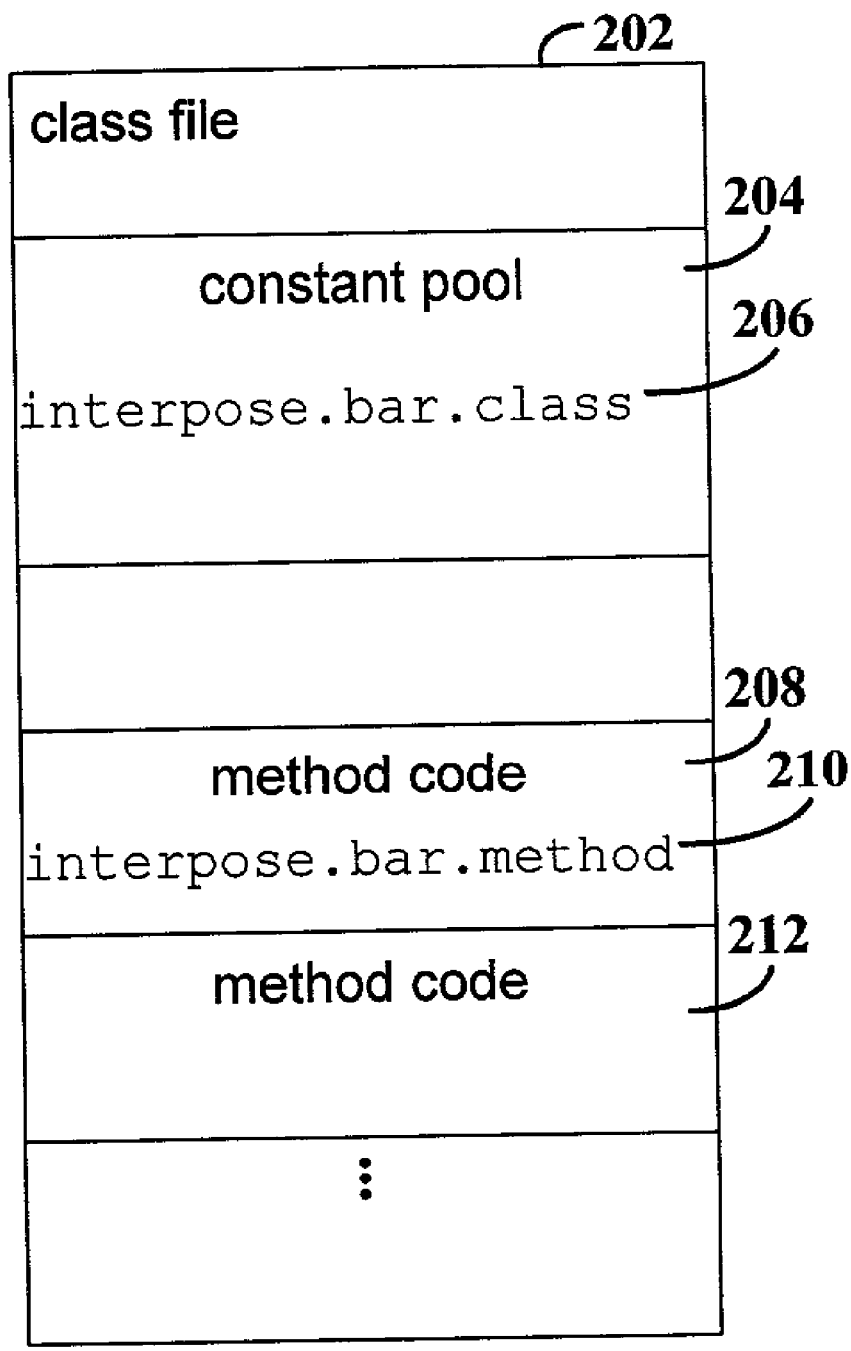
FIG. 3 illustrates an example class file that has been modified by a class loader.

FIG. 3 illustrates an example class file 202 that has been modified by class loader 156. The class file 156 includes a constant pool 204 and a set of descriptors. The constant pool includes constant types such as constant strings, class names (e.g., 206), method references, and method signatures. All references to constant types in a bytecode or other constant are stored as indices into the constant pool. Reference number 206 refers to the modified class name interpose.bar.class.

The set of descriptors describe fields, interfaces, methods (e.g., 208, 212), exception tables, and inner classes and other attributes of classes. Descriptors of fields, interfaces, and method descriptors include indices into the constant pool for the attribute name along with additional information that describes the attribute, for example, access flags, type, and initial value for a field or bytecode for a method. Reference number 210 refers to the modified bytecode for method 208. Note that not all substitute methods need not be provided for all the method codes in a class file. For example, method code 212 references a method for which no alternative method is interposed.

When loading a class, the class loader first checks the constant pool 204 of the class file to determine whether the class (or method) needs to be interposed before parsing the method bytecodes. If the class does not need to be interposed, then the method bytecodes don't need to be parsed for the interposed method. Because it is computationally expensive to parse the bytecodes, it is quicker to first check the constant pool, for example to see whether the foo.class refers to bar.class. If there is not reference, parsing the bytecodes is unnecessary.

Even though the invention is described in terms of service infrastructure such as JAVA, those skilled in the art will appreciate that teachings of the present invention could be adapted to other infrastructures, such as the .NET platform from Microsoft. It will also be appreciated that the invention is applicable to application programs that are not downloadable. In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for extending functionality of a first set of classes and methods in an application hosted by a computing arrangement, comprising:

establishing a mapping of original class names of classes in the first set to corresponding substitute class names of classes in a second set, wherein the classes in the second set change the functionality of the classes in the first set;

establishing a mapping of original method names of the first set to corresponding substitute method names of methods in a second set, wherein the methods in the second set change the functionality of the methods in the first set;

in response to loading a class file of a class in the first set, replacing in the class file original methods names with corresponding substitute method names;

in response to loading a class file of a class in the first set, replacing in the class file original class names with corresponding substitute class names;

instantiating classes referenced by the substitute class names in lieu of classes referenced by the original class names;

caching in a class cache on the computing system the class file having the substitute class names and substitute method names; and invoking methods referenced by the substitute method names in lieu of methods referenced by the original method names.

2. The method of claim 1, further comprising replacing the original class names with the substitute class names in a constant pool within the class file, and changing in the class file method invocation bytecodes from references to original methods to references to substitute methods.

3. The method of claim 2, wherein the classes in the first set are selected ones of standard API classes of a platform independent programming language, and the classes in the second set change the functionality of the selected ones of the standard API classes.

4. The method of claim 3, wherein the selected ones of the standard API classes include selected input and output API classes.

5. An apparatus for extending functionality of a first set of classes and methods in an application hosted by a computing arrangement, comprising:

means for establishing a mapping of original class names of classes in the first set to corresponding substitute class names of classes in a second set, wherein the classes in the second set change the functionality of the classes in the first set;

means for establishing a mapping of original method names of the first set to corresponding substitute method names of methods in a second set, wherein the methods in the second set change the functionality of the methods in the first set;

means, responsive to loading a class file of a class in the first set, replacing in the class file original methods names with corresponding substitute method names;

means, responsive to loading a class file of a class in the first set, for replacing in the class file original class names with corresponding substitute class names;

means for instantiating classes referenced by the substitute class names in lieu of classes referenced by the original class names;

means for caching in a class cache on the computing system the class file having the substitute class names and substitute method names; and means for invoking methods referenced by the substitute method names in lieu of methods referenced by the original method names.

6. A computing arrangement for extending functionality of a first set of classes and methods in an application program, comprising:

a second set of classes configured to change the functionality of the classes in the first set, wherein the second set of classes includes methods configured to change the functionality of the methods in the first set;

a mapping of original class names of classes in the first set to corresponding substitute class names of classes in the second set, wherein the mapping includes original method names of methods in the first set mapped to corresponding substitute method names of methods in the second set;

a virtual machine configured to host execution of the application program;

a class loader coupled to the virtual machine and responsive to a request from the virtual machine to load a class file of a class in the first set, the class loader configured to replace in class file original class names with corresponding substitute class names, whereby the virtual machine instantiates classes referenced by the substitute class names in lieu of classes referenced by the original class names, wherein the class loader is further configured to replace in class file original method names with corresponding substitute method names, whereby the virtual machine invokes methods referenced by the substitute method names in lieu of methods referenced by the original method names; and a class cache coupled to the class loader and to the virtual machine for cache storage of the class file.

7. The arrangement of claim 6, wherein the class loader is further configured to replace the original class names with the substitute class names in a constant pool within the class file, and change in the class file method invocation byte-codes from references to original methods to references to substitute methods.

8. The arrangement of claim 7, wherein the classes in the first set are selected ones of standard API classes of a platform independent programming language, and the classes in the second set change the functionality of the selected ones of the standard API classes.

9. The arrangement of claim 8, wherein the selected ones of the standard API classes include selected input and output API classes.

10. A method for processing a downloadable application program, comprising:

downloading the downloadable application program from a server system to a client system, wherein the downloadable application program includes a class file;

executing the downloadable application program on the client system;

loading a class file in response to execution of the downloadable application program;

determining from a first set of mapping data that includes at least one association of an original class name to a substitute class name, each class name in the class file that is named as an original name in the mapping data;

replacing in the class file each reference to a class name named as an original class name with the associated substitute class name;

determining from a second set of mapping data that includes at least one association of an original method name to a substitute method name, each method name in the class file that is named as an original method name in the second set of mapping data, wherein a function implemented by a method with a substitute method name is different from a function implemented by a method with the associated original method name;

replacing in the class file each original method name having an associated substitute method name with the associated substitute method name;

caching the class file in a class cache on the client system after the replacing step;

during execution of the downloadable application program resolving each reference to a substitute class name in the class file; and invoking methods referenced by the substitute method names in lieu of methods referenced by the original method names.

11. The method of claim 10, further comprising downloading a mapping file that contains the mapping data from the server system to the client system along with the downloading of the downloadable application program.

12. The method of claim 10, further comprising configuring the client system with the mapping data prior to the downloading of the downloadable application program.

13. The method of claim 10, further comprising statically configuring a class loader with the mapping data prior to downloading the downloadable application program.

* * * * *

UNITED STATES PATENT AND TRADEMARK OFFICE
CERTIFICATE OF CORRECTION

| | |
|---|---|
| PATENT NO. | : 7,093,242 B2 |
| APPLICATION NO. | : 09/993229 |
| DATED | : August 15, 2006 |
| INVENTOR(S) | : Philippe Bernadat et al. |

It is certified that error appears in the above-identified patent and that said Letters Patent is hereby corrected as shown below:

On the Title page, in field (56), under "Other Publications", in column 2, line 6, delete "Hewlwtt-packard" and insert -- Hewlett-Packard --, therefor.

Signed and Sealed this

Twenty-sixth Day of May, 2009

JOHN DOLL
*Acting Director of the United States Patent and Trademark Office*